3,282,788
EXTRACTS OF MAMMALIAN KIDNEY
Edward G. Daniels and Jack W. Hinman, Portage, Mich., assignors to The Upjohn Company, Kalamazoo, Mich., a corporation of Delaware
No Drawing. Filed June 8, 1964, Ser. No. 373,502
3 Claims. (Cl. 167—74.6)

This application is a continuation-in-part of co-pending application Serial No. 258,137, filed February 13, 1963, now Patent No. 3,172,813.

This invention relates to extracts from natural sources and to a process for their preparation, more particularly, extracts of mammalian kidney and a process for their preparation.

Extracts of mammalian kidney and processes therefor are known in the art. Page et al., Annals of Internal Medicine, vol. 18, No. 1, pp. 29–42, January 1943; Jonnard et al., J. A. Ph. A. (Scientific Edition), pp. 260–278, October 1943; Booth et al., Journal of Clinical Investigation, 42, 918 (1963); Muirhead et al., Journal of Clinical Investigation, 40: 1065 (1961); Muirhead et al., Journal of Clinical Investigation 41: 1387 (1962); Muirhead et al., Federal Proceedings 22: 181 (1963). Biological activities of mammalian kidney extracts are also known in the art. Booth et al.; Muirhead et al. (supra); Hickler et al., Journal of Clinical Investigation, 42: 942 (1963); and Lee et al., Circulation Research 13: 359 (1963).

Notwithstanding the prior art disclosures of extracts of mammalian kidney and biological activities thereof, extracts of mammalian kidney which are substantially free of contaminants have not been described. That is to say, both crude and refined extracts have been mixtures of two substances, one showing vasodepressor action (depression of blood pressure) in a normotensive state and the other an antihypertensive action (prevention of increase in blood pressure) in a hypertensive state. That the said extracts contain the two substances is confirmed by biological assays of mammalian kidney extracts before and after the novel partitioning process described herein. The substance having vasodepressor action in a normotensive state is assayed in dogs prepared according to the technique of Lee et al., Circulation Res. 13: 359 (1963). These dogs are anesthetized, vagotomized and pentolinium-treated (AVPT dogs). The material to be assayed is administered in ethyl alcohol which is diluted to 1 to 10 with physiological saline or 5% dextrose for intravenous injection. The substance having antihypertensive action in a hypertensive state is assayed in renoprival dogs, Muirhead et al., Circulation Res. 7: 68 (1959). The material to be assayed is administered in ethyl alcohol sublingually, once daily (0.05 ml./kg./day).

Failure of those working in this art to describe mammalian kidney extracts free of contaminating substances constitutes a serious deficiency, for specificity of biological activity of extracts of naturally occurring substances such as mammalian kidney is a desideratum in the direct use of said extracts to ameliorate blood pressure disorders and in their use as intermediates for further processing and preparation of more potent substances, as by preparative thin layer chromatography on silica gels.

It has now been found in accordance with the present invention that extracts of mammalian kidney can be separated into two substances which differ chemically and biologically. The process for the separation of such kidney extracts comprises the steps of applying a water-saturated butanol solution of mammalian kidney extract to a cross-linked dextran gel previously equilibrated with butanol-saturated water and fractionally eluting the so-charged dextran gel with water-saturated butanol. During the fractional elution with water-saturated butanol separation is achieved into (1) an acidic dry solid extract demonstrating vasodepressor activity in normotensive animals and substantially free of antihypertensive activity in hypertensive animals and (2) a neutral dry solid extract demonstrating antihypertensive activity in hypertensive animals and substantially free of vasodepressor activity in normotensive animals.

Mammalian kidney for the inventive process means fresh and frozen canine, bovine, porcine, ovine, and human kidney. Whole mammalian kidney or the anatomically separated medulla thereof can be utilized, the latter being preferred. Various extracts of such kidneys are suited for the inventive process which partitions the extracts into separated substances. The kidneys can be extracted with aqueous acetone or an aqueous lower alkanol containing about 45% water, the extract separated from the kidney tissue, and the separated extract concentrated to dryness, preferably by freeze-drying, to provide dry solid extract for partitioning. The dry solid extract, or an aqueous dispersion thereof, can be treated with n-hexane to remove soluble material, and the n-hexane insoluble portion can be used for partitioning. The n-hexane insoluble portion can be extracted with ethyl acetate, the ethyl acetate separated and concentrated to dryness to provide dry solid extract suited for the partitioning. The ethyl acetate extract can be applied to silica, recovered by elution of the silica with ethyl acetate and the recovered eluate concentrated to dryness to provide dry solid extract for the partitioning step. Distribution of an extract in two-phase distribution systems containing (1) a mixture of benzene, cyclohexane, ethanol and water (5:5:8:2); and (2) a mixture of ethyl acetate, cyclohexane, ethanol and water (1:1:1:1); separating and concentrating the phases to dryness in vacuo also provides dry solid extract suitable for partitioning over cross-linked dextran gels.

As used herein, the term cross-linked dextran gel means those gels available commercially from Pharmacia Fine Chemicals, Inc., Rochester, Minnesota, U.S.A. They are cross-linked dextran gels with various water regain values as determined by the method of Per Flodin, "Dextran Gels and Their Applications," Meijels, Bokindustri, Halmstad, Sweden, 1962. Gels having water regain values of from about 2.3 to about 8 gm./gm. of dry weight are operable, e.g., Sephadex G–25, Sephadex G–50, and Sephadex G–75. Sephadex G–25 is preferred. The term fractional elution means contacting the gel on which kidney material is adsorbed with an eluant, preferably by allowing the eluant to flow through a column of the gel to which the kidney extract has been applied, and collecting suitable portions of eluate. The portions of eluate are collected and combined on the basis of the relationship of their volume to the particular volume of the gel. A first portion of eluate preferably equivalent to about 0.3 of the volume of the gel is collected and discarded. It represents the approximate hold-up volume of the gel. Next a second portion of eluate preferably equivalent to from about 0.3 to about 0.7 of the volume of the gel is collected and concentrated to dryness in vacuo at a temperature of no higher than about 40° C. The dry solid extract thereby obtained consists essentially of an acidic substance having vasodepressor biological activity in normotensive animals. Next, a third portion of eluate preferably equivalent to from about 0.7 to about twice the volume of the gel is collected and concentrated to dryness in vacuo at a temperature no higher than about 40° C. The dry solid extract thereby obtained consists essentially of a neutral substance having antihypertensive biological activity in hypertensive animals. Assays of the dry solid extracts by the above-described methods show that a heretofore undescribed separation of kidney extract has been accomplished into two substances having different biological and chemical properties, i.e., an extract biologically active in both the renoprival dogs and AVPT dogs before dextran gel partitioning, is separated into (1) an extract which retains a high order of biological activity in the renoprival dog while being substantially free of biological activity in the AVPT dogs, and (2) an extract which retains a high order of biological activity in the AVPT dogs while being substantially free of biological activity in the renoprival dogs. In addition to demonstrating these different biological properties, the extracts differ chemically. The extract retaining the high order of activity in the AVPT dogs is acidic as shown by its extraction into alkaline aqueous solutions from solvents such as ethyl acetate with ethylene dichloride and chloroform. The extract retaining the high order of biological activity in the renoprival dogs is neutral as shown by its failure to extract from such solvents into the alkaline aqueous solutions and by its failure to adsorb on either anion or cation exchange resins. Both extracts are insoluble in water or hexane and soluble in ketones such as acetone and methyl ethyl ketone, lower alkanols such as methanol and ethanol, ethyl acetate, ether, and in halogenated organic solvents such as ethylene dichloride, chloroform, and carbon tetrachloride.

*Example 1*

A silica adsorption and elution extract was applied to a Sephadex G–25 column (340 ml.). After collection of one hold-up volume (about 120 ml.) which was discarded, sequential fractional eluates from the partition column were combined and concentrated to dryness in vacuo at a temperature of about 35° C.

| Portion of Eluate | Dry Solid Extract, mg. | Biological Activity | |
|---|---|---|---|
| | | Renoprival Dog | AVPT Dog |
| 120 ml.[1] | | | |
| 120–215 ml. | 893 | Inactive | 21 mm. drop in pressure for 8 minutes at a dosage of 190 μg./kg. |
| 215–350 ml. | Minimal | Not assayed | Not assayed. |
| 350–505 ml. | 338 | Active at a dose of 270 μg./kg.[2] | Inactive at a dose of 145 μg./kg.[3] |
| 505–630 ml. | 290 | | Inactive at a dose of 124 μg./kg.[3] |

[1] Discarded.
[2] Assay run on pooled extracts.
[3] Assays run on separate dry extracts.

*Example 2*

9.92 gm. of dry solid extract prepared from porcine whole kidney by ethylacetate extraction was dissolved in 30 ml. of water-saturated 1-butanol.

A 1300 ml. column of Sephadex G–25 was equilibrated with 1-butanol saturated water and the solution of the dry extract was applied thereto. The column was eluted with additional water-saturated 1-butanol. Fractions of eluate were collected, pooled and concentrated to dryness in vacuo at a temperature of about 35° C., as shown below.

Portion of eluate:            Dry solid extract, gm.
  400 ml. (discarded) _____
  400 to 950 ml. _____ 5.78
  950 to 1180 ml. _____ 2.39
  1180 to 2400 ml. _____ 0.40

The 5.78 gm. of dry solid extract is biologically active in the anesthetized, vagotomized, pentolinium-treated dogs and substantially free of activity in the renoprival dogs. The 0.40 gm. of dry solid extract is biologically active in the renoprival dogs and substantially free of biological activity in the anesthetized, vagomized, pentolinium-treated dogs.

*Example 3*

Approximately 15 gms. of dry solid extract prepared from porcine kidney medullas by silica adsorption and elution was dissolved in 25 ml. of water-saturated 1-butanol.

A column of Sephadex G–25 was poured in 1-butanol-saturated water and rinsed with water-saturated 1-butanol. Volume of column was 37 mm.×51 cm. (540 ml.).

The water-saturated 1-butanol solution was applied to the column an delution was carried out with additional water-saturated 1-butanol. 20 ml. fractions of eluate were collected, combined and evaporated to dryness in vacuo at about 35° C., as shown below.

Portion of eluate:            Dry solid extract, gm.
  Fractions 1 to 7 inc. (discarded) _____
  Fractions 8 to 19 inc. _____ 14.800
  Fractions 20 to 25 inc. _____ .098
  Fractions 26 to 54 inc. _____ .240
  Fractions 55 to 70 inc. _____ .316

The dry solid extract from fractions 8 to 19 inclusive is biologically active in the anesthetized, vagotomized, pentolinium-treated dogs and substantially free of activity in the renoprival dogs.

The dry solid extracts from fractions 20 to 70 inclusive are biologically active in the renoprival dogs and substantially free of activity in the anesthetized, vagotomized, pentolinium-treated dogs.

TABLE.—SUMMARY OF BIOLOGICAL ACTIVITY OF PORCINE KIDNEY MEDULLA EXTRACTS

| Type of Extract | No. AVPT Dogs, No. Injections | Dose Range x Renoprival | Dry Wt. 1 Renoprival Dose, ug./kg. | Rate Injections, Secs. | Level BP at Time of Injections, mm. Hg | Maximal ΔBP, mm. Hg | Time for ΔBP Begin After Injection, Secs. | Time Reach Max. ΔBP, Secs. | Duration ΔBP, Mins. | Injections, No. Active/ No. Inactive |
|---|---|---|---|---|---|---|---|---|---|---|
| Ethyl Acetate Concentrate | 4 / 6 | 1–2 | 1,000 | [1] 18 / 12–40 | 124 / 114–140 | 27 / 4–58 | 6 / 3–10 | 19 / 15–25 | 2.9 / 1.6–4 | 4/2 |
| Solvent Distribution | 12 / 24 | 1–6 | 330 | 23 / 7–40 | 114 / 80–176 | 27 / 16–56 | 13 / 2–40 | 45 / 15–135 | 5.2 / 1–14 | 24/0 |
| Dextan gel Sephadex Partitioning | 3 / 5 | 1–6 | 15–30 | 31 / 12–60 | 128 / 116–142 | 2 / 0–10 | 4 / 0–20 | 18 / 0–90 | 1–5 / 0–7.5 | 0/5 |
| Ethanol Control | 14 / 20 | 2–8 By vol. | | 29 / 3–95 | 111 / 98–142 | 2 / 0–12 | 38 / 10–100 | 20 / 0–190 | 3.0 / 0–6.6 | 0/20 |

[1] In columns 5 through 10 from the left, the upper value is the mean value and the lower value represents the range. By "x renoprival" of column 3 is meant the number of doses considered sufficient for evaluation of antihypertensive activity. For the ethanol control group in column 3 "by vol." is meant the volume equivalent to that used with the renal extracts.

The data show that before dextran gel partitioning the extracts are active in both renoprival and AVPT dogs. After dextran gel partitioning the extract is still very active in the renoprival dogs and substantially free of activity in the AVPT dogs.
Δ=depression.
BP=blood pressure.

What is claimed is:
1. In a process of preparing extracts of mammalian kidney the steps comprising:
  (1) applying a solution of mammalian kidney extract in water-saturated 1-butanol to a cross-linked dextran gel having a water regain value of from about 2.3 to about 8 gm. per gm. of dry weight,
  (2) fractionally eluting adsorbed material from the gel with 1-butanol-saturated water,

(3) collecting and discarding a first portion of eluate equivalent to about 0.3 of the volume of the gel,
(4) collecting a second portion of eluate equivalent to from about 0.3 to about 0.7 of the volume of the gel, and concentrating said second portion to dryness in vacuo at a temperature no higher than about 40° C., and
(5) collecting a third portion of eluate equivalent to from about 0.7 to about twice the volume of the gel, and concentrating said third portion to dryness in vacuo at a temperature no higher than about 40° C.

2. A solid extract separated from mammalian kidney and characterized by
  (1) being soluble in ketones, lower alkanols, ethyl acetate, ether and halogenated organic solvents;
  (2) being insoluble in water and hexane;
  (3) being extracted into alkaline aqueous solution from ethyl acetate, ethylene dichloride and chloroform;
  (4) consisting essentially of an acidic substance having vasodepressor biological activity in normotensive animals; and
  (5) being substantially free of a neutral substance having antihypertensive biological activity in hypertensive animals.

3. A solid extract separated from mammalian kidney and characterized by
  (1) being soluble in ketones, lower alkanols, ethyl acetate, ether and halogenated organic solvents;
  (2) being insoluble in water and hexane;
  (3) failure to extract into alkaline aqueous solutions from ethyl acetate, ethylene dichloride and chloroform;
  (4) failure to adsorb on anion or cation exchange resins;
  (5) consisting essentially of a neutral substance having antihypertensive biological activity in hypertensive animals when tested at levels of from about 15 mcg., to about 270 mcg./kg. in renoprival dogs; and
  (6) being substantially free of an acidic substance having vasodepressor biological activity in normotensive animals.

No references cited.

LEWIS GOTTS, *Primary Examiner.*

R. HUFF, *Assistant Examiner.*